United States Patent
Liu (10) Patent No.: US 11,432,266 B2
(45) Date of Patent: Aug. 30, 2022

(54) METHOD AND APPARATUS FOR TRANSMITTING DATA TO UE IN A DEVICE GROUP, AND COMPUTER STORAGE MEDIUM

(71) Applicant: GUANGDONG OPPO MOBILE TELECOMMUNICATIONS CORP., LTD., Guangdong (CN)

(72) Inventor: Jianhua Liu, Dongguan (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 167 days.

(21) Appl. No.: 16/926,463

(22) Filed: Jul. 10, 2020

(65) Prior Publication Data

US 2020/0344725 A1 Oct. 29, 2020

Related U.S. Application Data

(63) Continuation of application No. PCT/CN2018/091504, filed on Jun. 15, 2018.

(30) Foreign Application Priority Data

Jan. 12, 2018 (WO) ................ PCT/CN2018/072409

(51) Int. Cl.
*H04W 72/04* (2009.01)
*H04W 4/06* (2009.01)
*H04W 28/02* (2009.01)

(52) U.S. Cl.
CPC ............. *H04W 72/04* (2013.01); *H04W 4/06* (2013.01); *H04W 28/0268* (2013.01)

(58) Field of Classification Search
CPC ... H04W 72/04; H04W 4/06; H04W 28/0268; H04W 16/00; H04W 36/06; H04W 72/12;
(Continued)

(56) References Cited

U.S. PATENT DOCUMENTS

2015/0304821 A1 10/2015 Liu et al.
2015/0382372 A1* 12/2015 Vajapeyam ........... H04W 24/10
370/329
(Continued)

FOREIGN PATENT DOCUMENTS

CN 102387056 A 3/2012
CN 103200680 A 7/2013
(Continued)

OTHER PUBLICATIONS

First Office Action of the European application No. 18899858.7, dated Oct. 14, 2021.
(Continued)

*Primary Examiner* — Ian N Moore
*Assistant Examiner* — Brian T Le
(74) *Attorney, Agent, or Firm* — Ladas & Parry, LLP (57) ABSTRACT

Provided are a data transmission method and apparatus and a computer storage medium. The method includes that: a first core network element receives data from an external network, the data being data sent to a first device group (301); and the first core network element sends the data to an access network element through a first transmission resource to enable the access network element to send the data to User Equipment (UE) in the first device group through a second transmission resource (302).

18 Claims, 5 Drawing Sheets

(58) Field of Classification Search
CPC .... H04W 72/005; H04W 76/40; H04B 7/024; H04L 1/0001; H04L 5/00
See application file for complete search history.

(56) References Cited

U.S. PATENT DOCUMENTS

| | | |
|---|---|---|
| 2016/0088087 A1 | 3/2016 | Lo et al. |
| 2017/0215225 A1 | 7/2017 | Yi et al. |
| 2018/0027390 A1 | 1/2018 | He et al. |

FOREIGN PATENT DOCUMENTS

| | | |
|---|---|---|
| CN | 103685733 A | 3/2014 |
| CN | 103796170 A | 5/2014 |
| CN | 104683955 A | 6/2015 |
| CN | 104898449 A | 9/2015 |
| EP | 2854446 A1 | 4/2015 |
| EP | 2916571 A1 | 9/2015 |
| EP | 2999165 A1 | 3/2016 |
| EP | 3267703 A1 | 1/2018 |

OTHER PUBLICATIONS

3GPP TS 23.502 v2.0.0 (Dec. 2017), 3rd Generation Partnership Project; Technical Specification Group Services and System Aspects; Procedures for the 5G System; Stage 2; (Release 15), entire document.

First Office Action of the Chinese application No. 201880085623.X, dated Dec. 2, 2021.
International Search Report in the international application No. PCT/CN2018/091504, dated Oct. 24, 2018 and its English translation provided by WIPO.
International Search Report in the international application No. PCT/CN2018/072409, dated Sep. 12, 2018 and its English translation provided by WIPO.
Written Opinion in the international application No. PCT/CN2018/091504, dated Oct. 24, 2018 and its English machine translation.
Written Opinion in the international application No. PCT/CN2018/072409, dated Sep. 12, 2018 and its English machine translation.
3GPP TS 23.501 V1.0.0 (Jun. 2017), "System Architecture for the 5G System", Technical Specification Group Services and System Aspects, Stage 2, (Release 15).
3GPP TS 23.502 V1.0.0 (Sep. 2017), "Procedures for the 5G System", Technical Specification Group Services and System Aspects, Stage 2, (Release 15).
3GPP TSG SA Meeting #76 TD SP-170384, "Presentation of TR 23.501: System Architecture for the 5G System (Release 15) to TSG SA for Approval", Jun. 7-9, 2017, West Palm Beach, Florida, USA.
Written Opinion of the International Search Authority in the international application No. PCT/CN2018/091504, dated Oct. 24, 2018.
Written Opinion of the International Search Authority in the international application No. PCT/CN2018/072409, dated Sep. 12, 2018.
Supplementary European Search Report in the European application No. 18899858.7, dated Jan. 26, 2021.
Second Office Action of the Chinese application No. 201880085623.X, dated Mar. 16, 2022.

\* cited by examiner

METHOD AND APPARATUS FOR TRANSMITTING DATA TO UE IN A DEVICE GROUP, AND COMPUTER STORAGE MEDIUM

CROSS-REFERENCE TO RELATED APPLICATIONS

This application is a continuation of International Patent Application No. PCT/CN2018/091504 filed on Jun. 15, 2018, which claims priority to International Patent Application No. PCT/CN2018/072409 filed on Jan. 12, 2018, which are incorporated herein by reference in their entireties.

TECHNICAL FIELD

The disclosure relates to the technical field of wireless communications, and particularly to a data transmission method and apparatus and a computer storage medium.

BACKGROUND

In a future network, there may be many Internet of Things (IoT) devices. In an existing protocol, an IoT device, for example, a wearable device or a smart home device, may usually be connected with a smart phone of a user, and such a connection may be directly established through a direct interface therebetween, for example, a sidelink interface. A network, when needed to send a message to this group of User Equipment (UE) (for example, a wearable device+a smart phone), may need to send data to each at least one UE according to an existing manner, resulting in serious waste of resources.

SUMMARY

For solving the technical problem, embodiments of the disclosure provide a data transmission method and apparatus and a computer storage medium.

The embodiments of the disclosure provide a method for data transmission, which may include the following operations.

A first core network element receives data from an external network, the data being data sent to a first device group.

The first core network element sends the data to an access network element through a first transmission resource to enable the access network element to send the data to UE in the first device group through a second transmission resource.

The data may be transmitted in a user plane between the first core network element, the access network element and the UE.

In the embodiments of the disclosure, in a case that the first transmission resource and/or the second transmission resource are/is dedicated transmission resources/a dedicated transmission resource for the first device group, a device group corresponding to the data may be indicated as the first device group through resource attributes/a resource attribute of the first transmission resource and/or the second transmission resource.

In the embodiments of the disclosure, the first transmission resource may have at least one of following resource attributes: a physical-layer identifier, a logical channel, a bearer, a Quality of Service (QoS) flow, a Protocol Data Unit (PDU) session, an Internet Protocol (IP) channel and a General Packet Radio Service (GPRS) Tunneling Protocol (GTP) channel.

In the embodiments of the disclosure, in a case that the first transmission resource and/or the second transmission resource are/is common transmission resources/a common transmission resource, a device group corresponding to the data may be indicated as the first device group through group identification information of the first device group carried during transmission of the data, or, a device group corresponding to the data may be indicated as the first device group through identification information of at least one UE in the first device group and/or PDU session information of the at least one UE and/or QoS information of the at least one UE which are/is carried during transmission of the data.

In the embodiments of the disclosure, the operation that the device group corresponding to the data is indicated as the first device group through the group identification information of the first device group carried during transmission of the data may include the following operation.

The first core network element encapsulates the group identification information of the first device group into a PDU of a target protocol layer corresponding to the UE, the PDU including the data.

In the embodiments of the disclosure, the operation that the device group corresponding to the data is indicated as the first device group through the identification information of the at least one UE in the first device group and/or the PDU session information of the at least one UEd/or the QoS information of the at least one UE which are/is carried during transmission of the data may include the following operation.

The first core network element encapsulates the identification information of at least one UE in the first device group and/or the PDU session information of the at least one UE and/or the QoS information of the at least one UE into a PDU of a target protocol layer corresponding to the UE, the PDU including the data.

In the embodiments of the disclosure, the target protocol layer may be an IP layer or an Access Stratum (AS).

In the embodiments of the disclosure, the operation that the first core network element receives the data from the external network may include the following operation.

The first core network element receives the data from the external network through a third transmission resource, the third transmission resource being a dedicated transmission resource for the first device group.

In the embodiments of the disclosure, the data sent by the external network may contain the group identification information of the first device group or contain identification information of at least one UE in the first device group and/or PDU session information of the at least one UE and/or QoS information of the at least one UE.

In the embodiments of the disclosure, the identification information of the UE in the first device group may be external identification information, for example, a Generic Public Subscription Identifier (GPSI).

In the embodiments of the disclosure, a device group corresponding to the data may be indicated as the first device group through a resource attribute of the third transmission resource; or, a device group corresponding to the data may be indicated as the first device group through the group identification information of the first device group in the data, or, a device group corresponding to the data may be indicated as the first device group through identification information of at least one UE in the first device group and/or PDU session information of the at least one UE and/or QoS information of the at least one UE in the data.

In the embodiments of the disclosure, the operation that the first core network element sends the data to the access network element through the first transmission resource may include the following operation.

In response to there is a dedicated transmission for the first device group between the first core network element and the access network element, the first core network element sends the data to the access network element through the dedicated transmission resource.

In the embodiments of the disclosure, the operation that the first core network element sends the data to the access network element through the first transmission resource may include the following operations.

In response to there is no dedicated transmission resource for the first device group between the first core network element and the access network element, the first core network element requests for establishing a dedicated transmission resource for the first device group between the first core network element and the access network element.

The first core network element sends the data to the access network element through the dedicated transmission resource.

In the embodiments of the disclosure, the operation that the first core network element requests for establishing the dedicated transmission resource for the first device group between the first core network element and the access network element may include the following operations.

The first core network element requests a third core network element through a second core network element for establishing the dedicated transmission resource for the first device group between the first core network element and the access network element; or, the first core network element requests a third core network element for establishing the dedicated transmission resource for the first device group between the first core network element and the access network element.

In the embodiments of the disclosure, the first core network element, when requesting for establishing the dedicated transmission resource for the first device group between the first core network element and the access network element, may send group information of the first device group to a third core network element.

In the embodiments of the disclosure, the group information of the first device group may include at least one of PDU session information, QoS flow information, QoS information, core network address information, group identification information, an IP channel and a GTP channel.

In the embodiments of the disclosure, the operation that the first core network element sends the data to the access network element through the first transmission resource may include the following operation.

In response to there is a common transmission resource between the first core network element and the access network element, the first core network element sends the data to the access network element through the common transmission resource, the data containing the group identification information of the first device group or containing identification information of at least one UE in the first device group and/or PDU session information of the at least one UE and/or QoS information of the at least one UE.

In the embodiments of the disclosure, in response to there is no dedicated transmission resource for the first device group but there is the common transmission resource between the first core network element and the access network element, the first core network element may send the data to the access network element through the common transmission resource.

In the embodiments of the disclosure, the operation that the first core network element sends the data to the access network element through the first transmission resource may include the following operations.

In response to there is no common transmission resource between the first core network element and the access network element, the first core network element requests for establishing a common transmission resource between the first core network element and the access network element.

The first core network element sends the data to the access network element through the common transmission resource, the data containing group identification information of the first device group or containing identification information of at least one UE in the first device group and/or PDU session information of the at least one UE and/or QoS information of the at least one UE.

In the embodiments of the disclosure, the operation that the first core network element requests for establishing the common transmission resource between the first core network element and the access network element may include the following operations.

The first core network element requests a third core network element through a second core network element for establishing the common transmission resource between the first core network element and the access network element; or, the first core network element requests a third core network element for establishing the common transmission resource between the first core network element and the access network element.

The embodiments of the disclosure provide a method for data transmission, which may include the following operations.

An access network element receives data from a first core network element through a first transmission resource, the data being data sent to a first device group.

The access network element sends the data to UE in the first device group through a second transmission resource.

The data may be transmitted in a user plane between the first core network element, the access network element and the UE.

In the embodiments of the disclosure, in a case that the first transmission resource and/or the second transmission resource are/is dedicated transmission resources/a dedicated transmission resource for the first device group, a device group corresponding to the data may be indicated as the first device group through resource attributes/a resource attribute of the first transmission resource and/or the second transmission resource.

In the embodiments of the disclosure, the first transmission resource and/or the second transmission resource may have at least one of following resource attributes: a physical-layer identifier, a logical channel, a bearer, a QoS flow, a PDU session, an IP channel and a GTP channel.

In the embodiments of the disclosure, in a case that the first transmission resource and/or the second transmission resource are/is common transmission resources/a common transmission resource, a device group corresponding to the data may be indicated as the first device group through group identification information of the first device group carried during transmission of the data, or, a device group corresponding to the data may be indicated as the first device group through identification information of at least one UE in the first device group and/or PDU session information of the at least one UE and/or QoS information of the at least one UE which are/is carried during transmission of the data.

In the embodiments of the disclosure, the operation that the access network element sends the data to the UE in the first device group through the second transmission resource may include the following operation.

In response to there is a dedicated transmission for the first device group between the access network element and the UE, the access network element sends the data to the UE in the first device group through the dedicated transmission resource.

In the embodiments of the disclosure, the operation that the access network element sends the data to the UE in the first device group through the second transmission resource may include the following operation.

In response to there is a common transmission resource between the access network element and the UE, the access network element sends the data to the UE in the first device group through the common transmission resource, the data containing group identification information of the first device group or containing identification information of at least one UE in the first device group and/or PDU session information of the at least one UE and/or QoS information of the at least one UE.

The embodiments of the disclosure provide a method for data transmission, which may include the following operations.

UE receives data from an access network element through a second transmission resource, the data being data sent to a first device group.

The UE recognizes that a device group corresponding to the data is the first device group.

The data may be transmitted in a user plane between the access network element and the UE.

In the embodiments of the disclosure, the operation that the UE recognizes that the device group corresponding to the data is the first device group may include the following operation.

In a case that the second transmission resource is a dedicated transmission resource, the UE recognizes that the device group corresponding to the data is the first device group through a resource attribute of the second transmission resource.

In the embodiments of the disclosure, the second transmission resource may have at least one of following resource attributes: a physical-layer identifier, a logical channel, a bearer, a QoS flow, a PDU session, an IP channel and a GTP channel.

In the embodiments of the disclosure, the operation that the UE recognizes that the device group corresponding to the data is the first device group may include the following operation.

In a case that the second transmission resource is a common transmission resource, the UE recognizes that the device group corresponding to the data is the first device group through group identification information of the first device group in the data or through identification information of at least one UE in the first device group and/or PDU session information of the UE and/or QoS information of the UE in the data.

The embodiments of the disclosure provide an apparatus for data transmission, which may be applied to a first core network element and include a receiving unit and a sending unit.

The receiving unit may be configured to receive data from an external network, the data being data sent to a first device group.

The sending unit may be configured to send the data to an access network element through a first transmission resource to enable the access network element to send the data to UE in the first device group through a second transmission resource.

The data may be transmitted in a user plane between the first core network element, the access network element and the UE.

In the embodiments of the disclosure, in a case that the first transmission resource and/or the second transmission resource are/is dedicated transmission resources/a dedicated transmission resource for the first device group, a device group corresponding to the data may be indicated as the first device group through resource attributes/a resource attribute of the first transmission resource and/or the second transmission resource.

In the embodiments of the disclosure, the first transmission resource and/or the second transmission resource may have at least one of following resource attributes: a physical-layer identifier, a logical channel, a bearer, a QoS flow, a PDU session, an IP channel and a GTP channel.

In the embodiments of the disclosure, in a case that the first transmission resource and/or the second transmission resource are/is common transmission resources/a common transmission resource, a device group corresponding to the data may be indicated as the first device group through group identification information of the first device group carried during transmission of the data, or, a device group corresponding to the data may be indicated as the first device group through identification information of at least one UE in the first device group and/or PDU session information of the at least one UE and/or QoS information of the at least one UE which are/is carried during transmission of the data.

In the embodiments of the disclosure, the device may further include an encapsulation unit.

The encapsulation unit may be configured to encapsulate the group identification information of the first device group into a PDU of a target protocol layer corresponding to the UE, the PDU including the data.

In the embodiments of the disclosure, the device may further include an encapsulation unit.

The encapsulation unit may be configured to encapsulate the identification information of at least one UE in the first device group and/or the PDU session information of the at least one UE and/or the QoS information of the at least one UE into a PDU of a target protocol layer corresponding to the UE, the PDU including the data.

In the embodiments of the disclosure, the target protocol layer may be an IP layer or an AS.

In the embodiments of the disclosure, the receiving unit may be configured to receive the data from the external network through a third transmission resource, the third transmission resource being a dedicated transmission resource for the first device group.

In the embodiments of the disclosure, the data sent by the external network may contain the group identification information of the first device group or contain identification information of at least one UE in the first device group and/or PDU session information of the at least one UE and/or QoS information of the at least one UE.

In the embodiments of the disclosure, the identification information of the UE in the first device group may be external identification information.

In the embodiments of the disclosure, a device group corresponding to the data may be indicated as the first device group through a resource attribute of the third transmission resource; or, a device group corresponding to the data may be indicated as the first device group through group identification information of the first device group in the data, or, a device group corresponding to the data may be indicated as the first device group through identification information of at least one UE in the first device group and/or PDU session information of the at least one UE and/or QoS information of the at least one UE in the data.

In the embodiments of the disclosure, in response to there is a dedicated transmission for the first device group between the first core network element and the access network element, the sending unit may be further configured to send the data to the access network element through the dedicated transmission resource.

In the embodiments of the disclosure, the device may further include a first request unit and a first establishment unit.

The first request unit may be configured to, in response to there is no dedicated transmission resource for the first device group between the first core network element and the access network element, request for establishing a dedicated transmission resource for the first device group between the first core network element and the access network element.

The first establishment unit may be configured to establish the dedicated transmission resource for the first device group between the first core network element and the access network element.

The sending unit may be further configured to send the data to the access network element through the dedicated transmission resource.

In the embodiments of the disclosure, the first request unit may be configured to request a third core network element through a second core network element for establishing the dedicated transmission resource for the first device group between the first core network element and the access network element or request a third core network element for establishing the dedicated transmission resource for the first device group between the first core network element and the access network element.

In the embodiments of the disclosure, the request unit may be further configured to, when requesting for establishing the dedicated transmission resource for the first device group between the first core network element and the access network element, send group information of the first device group to a third core network element.

In the embodiments of the disclosure, the group information of the first device group may include at least one of PDU session information, QoS flow information, QoS information, core network address information, group identification information, an IP channel and a GTP channel.

In the embodiments of the disclosure, in response to there is a common transmission resource between the first core network element and the access network element, the sending unit may be further configured to send the data to the access network element through the common transmission resource, the data containing the group identification information of the first device group or containing identification information of at least one UE in the first device group and/or PDU session information of the at least one UE and/or QoS information of the at least one UE.

In the embodiments of the disclosure, in response to there is no dedicated transmission resource for the first device group but there is the common transmission resource between the first core network element and the access network element, the sending unit may be further configured to send the data to the access network element through the common transmission resource.

In the embodiments of the disclosure, the device may further include a second request unit and a second establishment unit.

The second request unit may be configured to, in response to there is no common transmission resource between the first core network element and the access network element, request for establishing a common transmission resource between the first core network element and the access network element.

The second establishment unit may be configured to establish the common transmission resource between the first core network element and the access network element.

The sending unit may be further configured to send the data to the access network element through the common transmission resource, the data containing group identification information of the first device group or containing identification information of at least one UE in the first device group and/or PDU session information of the at least one UE and/or QoS information of the at least one UE.

In the embodiments of the disclosure, the second request unit may be configured to request a third core network element through a second core network element for establishing the common transmission resource between the first core network element and the access network element or request a third core network element for establishing the common transmission resource between the first core network element and the access network element.

The embodiments of the disclosure provide an apparatus for data transmission, which may be applied to an access network element and include a receiving unit and a sending unit.

The receiving unit may be configured to receive data from a first core network element through a first transmission resource, the data being data sent to a first device group.

The sending unit may be configured to send the data to UE in the first device group through a second transmission resource.

The data may be transmitted in a user plane between the first core network element, the access network element and the UE.

In the embodiments of the disclosure, in a case that the first transmission resource and/or the second transmission resource are/is dedicated transmission resources/a dedicated transmission resource for the first device group, a device group corresponding to the data may be indicated as the first device group through resource attributes/a resource attribute of the first transmission resource and/or the second transmission resource.

In the embodiments of the disclosure, the first transmission resource and/or the second transmission resource may have at least one of following resource attributes: a physical-layer identifier, a logical channel, a bearer, a QoS flow, a PDU session, an IP channel and a GTP channel.

In the embodiments of the disclosure, in a case that the first transmission resource and/or the second transmission resource are/is common transmission resources/a common transmission resource, a device group corresponding to the data may be indicated as the first device group through group identification information of the first device group carried during transmission of the data, or, a device group corresponding to the data may be indicated as the first device group through identification information of at least one UE in the first device group and/or PDU session information of the at least one UE and/or QoS information of the at least one UE which are/is carried during transmission of the data.

In the embodiments of the disclosure, in response to there is a dedicated transmission for the first device group between the access network element and the UE, the sending unit may be further configured to send the data to the UE in the first device group through the dedicated transmission resource.

In the embodiments of the disclosure, in response to there is a common transmission resource between the access network element and the UE, the sending unit may be further configured to send the data to the UE in the first device group through the common transmission resource, the data containing group identification information of the first device group or containing identification information of at least one UE in the first device group and/or PDU session information of the at least one UE and/or QoS information of the at least one UE.

The embodiments of the disclosure provide an apparatus for data transmission, which may be applied to UE and include a receiving unit and a recognition unit.

The receiving unit may be configured to receive data from an access network element through a second transmission resource, the data being data sent to a first device group.

The recognition unit may be configured to recognize that a device group corresponding to the data is the first device group.

The data may be transmitted in a user plane between the access network element and the UE.

In the embodiments of the disclosure, in a case that the second transmission resource is a dedicated transmission resource, the recognition unit may be configured to recognize that the device group corresponding to the data is the first device group through a resource attribute of the second transmission resource.

In the embodiments of the disclosure, the second transmission resource may have at least one of following resource attributes: a physical-layer identifier, a logical channel, a bearer, a QoS flow, a PDU session, an IP channel and a GTP channel.

In the embodiments of the disclosure, in a case that the second transmission resource is a common transmission resource, the recognition unit may be configured to recognize that the device group corresponding to the data is the first device group through group identification information of the first device group in the data or recognize that the device group corresponding to the data is the first device group through identification information of at least one UE in the first device group and/or PDU session information of the at least one UE and/or QoS information of the at least one UE in the data.

The embodiments of the disclosure provide a computer storage medium which has computer-executable instruction stored thereon that, when executed by a processor, may implement the methods for data transmission above.

According to the technical solutions of the embodiments of the disclosure, a first core network element may receive data from an external network, the data being the data sent to a first device group; and the first core network element may send the data to an access network element through a first transmission resource to enable the access network element to send the data to UE in the first device group through a second transmission resource, the data being transmitted in a user plane between the first core network element, the access network element and the UE. With adoption of the technical solutions of the embodiments of the disclosure, when a network is needed to send data to a device group, group data of the device group may be transmitted in the user plane, and the data may be not required to be sent to each UE in the device group, so that resource waste can be avoided.

BRIEF DESCRIPTION OF THE DRAWINGS

The drawings described herein are adopted to provide a further understanding to the disclosure and form a part of the application. Schematic embodiments of the disclosure and descriptions thereof are adopted to explain the disclosure and not intended to form improper limits to the disclosure. In the drawings.

DETAILED DESCRIPTION

For making the characteristics and technical contents of the embodiments of the disclosure understood in more detail, implementation of the embodiments of the disclosure will be described below in combination with the drawings in detail. The drawings are only adopted for description as references and not intended to limit the embodiments of the disclosure.

Figure 1:
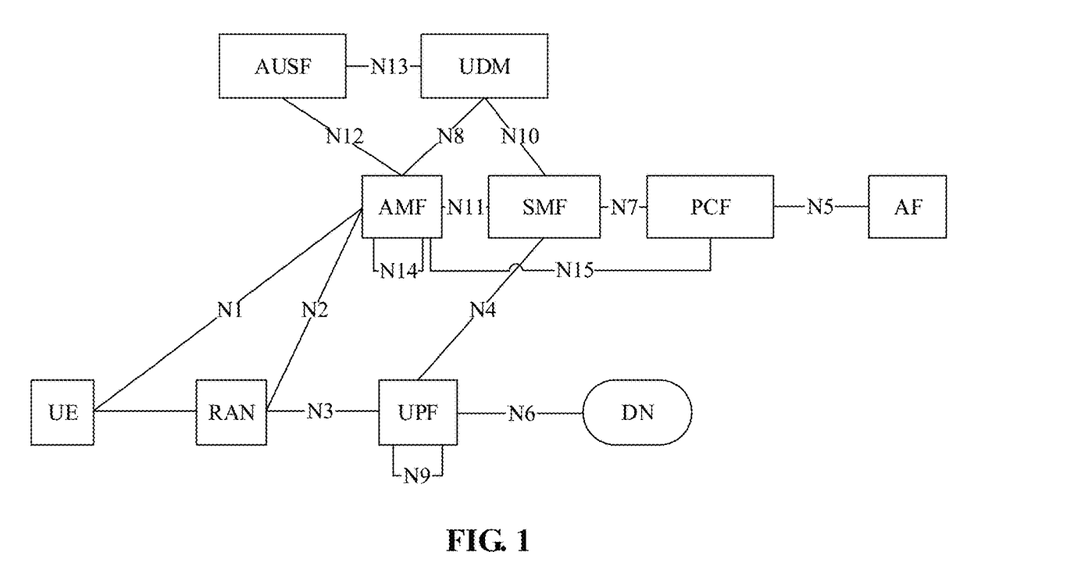
FIG. 1 is a system architecture diagram of a 5th-Generation (5G) network according to an embodiment of the disclosure.

FIG. 1 is a system architecture diagram of a 5G network according to an embodiment of the disclosure. As shown in FIG. 1, devices involved in a 5G network system include:

UE, a Radio Access Network (RAN), a User Plane Function (UPF), a Data Network (DN), a Core Access and Mobility Management Function (AMF), a Session Management Function (SMF), a Policy Control Function (PCF), an Application Function (AF), an Authentication Server Function (AUSF) and Unified Data Management (UDM).

Figure 2:
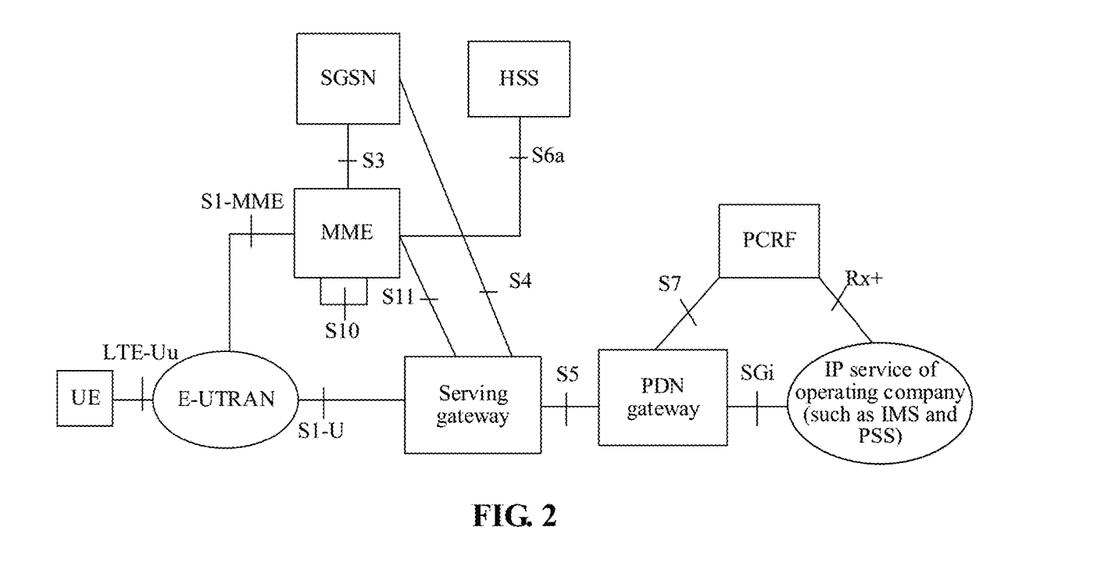
FIG. 2 is a system architecture diagram of a 4th-Generation (4G) network according to an embodiment of the disclosure.

FIG. 2 is a system architecture diagram of a 4G network according to an embodiment of the disclosure. As shown in FIG. 2, devices involved in a 4G network system include:

UE, an Evolved Universal Terrestrial Radio Access Network (E-UTRAN), a Mobility Management Entity (MME) network element, a Serving General Packet Radio Service (GPRS) Support Node (SGSN), a Home Subscriber Server (HSS), a serving gateway, a Packet Data Network (PDN) gateway and a Policy and Charging Rules Function (PCRF).

The examples of FIG. 1 and FIG. 2 are only examples of network architectures implementing the embodiments of the disclosure. The embodiments of the disclosure are not limited to the network structures of FIG. 1 and FIG. 2.

Figure 3:
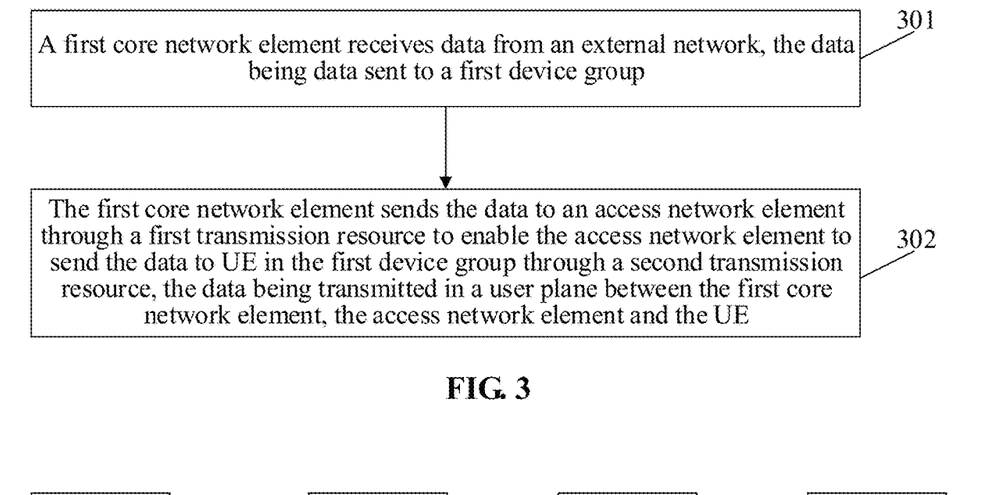
FIG. 3 is a first flowchart of a data transmission method according to an embodiment of the disclosure.

FIG. 3 is a first flowchart of a data transmission method according to an embodiment of the disclosure. As shown in FIG. 3, the data transmission method includes the following operations.

In operation 301, a first core network element receives data from an external network, the data being data sent to a first device group.

In the embodiments of the disclosure, the external network may be a DN, the first core network element may be a UPF, and the access network element may be a RAN. In addition, the first device group may include one UE or include two or more UEs.

In the embodiment of the disclosure, the first core network element may receive the data from the external network through a third transmission resource, the third transmission resource being a dedicated transmission resource for the first device group.

In an implementation mode, the data sent by the external network may contain group identification information of the first device group or contain identification information of at least one UE in the first device group and/or PDU session information of the at least one UE and/or QoS information of the at least one UE. Herein, the identification information of the UE in the first device group may be external identification information, for example, a GPSI.

Herein, a device group corresponding to the data may be indicated in the following manners.

1) the device group corresponding to the data may be indicated as the first device group through a resource attribute of the third transmission resource; or, 2) the device group corresponding to the data may be indicated as the first device group through the group identification information of the first device group in the data, or, the device group corresponding to the data may be indicated as the first device group through the identification information of at least one UE in the first device group and/or PDU session information of the at least one UE and/or QoS information of the at least one UE in the data.

Figure 4:
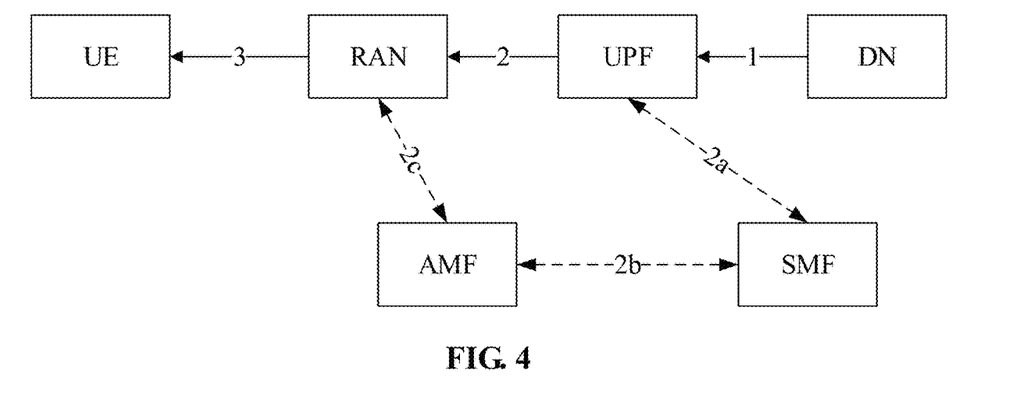
FIG. 4 is a schematic diagram of a user plane transmission path according to an embodiment of the disclosure.

The embodiment of the disclosure is described with a 5G system as an example. As shown in FIG. 4, downlink group data may be transmitted to UE through a user plane. Herein, the group data refers to data sent to a group device.

Referring to the operation 1 of FIG. 4, when an external network has data to be sent to a first device group, a DN may send the data to a UPF, and the data may be sent through a specific group channel, for example, a specific IP address, a specific device address and a specific GTP-User plane (GTP-U) channel. In an implementation mode, the DN may contain the group identification information in the sent data.

In operation 302, the first core network element sends the data to an access network element through a first transmission resource to enable the access network element to send the data to UE in the first device group through a second transmission resource, the data being transmitted in a user plane between the first core network element, the access network element and the UE.

In the embodiment of the disclosure, in a case that the first transmission resource and/or the second transmission resource are/is dedicated transmission resources/a dedicated transmission resource for the first device group, the device group corresponding to the data may be indicated as the first device group through resource attributes/a resource attribute of the first transmission resource and/or resource attributes/a resource attribute of the second transmission resource.

The first transmission resource and/or the second transmission resource may have at least one of the following resource attributes: a physical-layer identifier, a logical channel, a bearer, a QoS flow, a PDU session, an IP channel and a GTP channel.

In the embodiment of the disclosure, in a case that the first transmission resource and/or the second transmission resource are/is common transmission resources/a common transmission resource, the device group corresponding to the data may be indicated as the first device group through the group identification information of the first device group carried during transmission of the data, or, the device group corresponding to the data may be indicated as the first device group through the identification information of at least one UE in the first device group and/or the PDU session information of the at least one UE and/or the QoS information of the at least one UE which are/is carried during transmission of the data.

In an implementation mode, the first core network element may encapsulate the group identification information of the first device group into a PDU of a target protocol layer corresponding to the UE, the PDU including the data. In another implementation mode, the first core network element may encapsulate the identification information of at least one UE in the first device group and/or the PDU session information of the at least one UE and/or the QoS information of the at least one UE into a PDU of a target protocol layer corresponding to the UE, the PDU including the data.

Herein, the target protocol layer is an IP layer or an AS.

During specific implementation, the UPF may encapsulate the group identification information into a peer protocol layer (for example, the IP layer or the AS), corresponding to the UE, of the UPF, and a RAN side may be not required to recognize the group identification information. When the UE receives a data unit of the peer protocol layer of the UPF, the UE may recognize the specific group that the data belongs to.

In the embodiments of the disclosure, the operation that the first core network element sends the data to the access network element through the first transmission resource specifically includes the following conditions.

A first condition: in response to there is a dedicated transmission for the first device group between the first core network element and the access network element, the first core network element may send the data to the access network element through the dedicated transmission resource.

Referring to operation 2 of FIG. 4, the UPF, when receiving the external group data, may send the data to the RAN, and in response to there is a group-dedicated connection channel between the RAN and the UPF, the UPF may send the data to the RAN through the group-dedicated connection channel.

A second condition: in response to there is no dedicated transmission resource for the first device group between the first core network element and the access network element, the first core network element may request for establishing a dedicated transmission resource for the first device group between the first core network element and the access network element; and the first core network element may send the data to the access network element through the dedicated transmission resource.

In an implementation mode, the first core network element may request a third core network element through a second core network element for establishing the dedicated transmission resource for the first device group between the first core network element and the access network element, or, the first core network element may request a third core network element for establishing the dedicated transmission resource for the first device group between the first core network element and the access network element.

In an implementation mode, the first core network element, when requesting for establishing the dedicated transmission resource for the first device group between the first core network element and the access network element, may send group information of the first device group to the third core network element, the group information of the first device group including at least one of PDU session information, QoS flow information, QoS information, core network address information, group identification information, an IP channel and a GTP channel.

Referring to operations 2a, 2b, 2c and 2 of FIG. 4, in response to there is no group-dedicated connection channel between the RAN and the UPF, the UPF may send a request message for establishing a group-dedicated connection channel (called a request message for short) to an SMF in a core network, as shown in operation 2a. Related group information may be contained, for example, PDU session information, QoS flow information, QoS information, core network address information and group identification information. As shown in operation 2b, the SMF may request an AMF for establishing the group-dedicated connection channel between the UPF and the RAN, the related group information being contained, for example, the PDU session information, the QoS flow information, the QoS information, the core network address information and the group identification information. The AMF, after receiving the request message, may send the request message to the RAN, and the RAN may return a response message to acknowledge the establishment of the group-dedicated connection channel. The AMF may transmit the response message to the SMF, and the SMF may notify the UPF of information of the group-dedicated connection channel in the response message.

A third condition: in response to there is a common transmission resource between the first core network element and the access network element, the first core network element may send the data to the access network element through the common transmission resource, the data containing group identification information of the first device group or containing identification information of at least one UE in the first device group and/or PDU session information of the at least one UE and/or QoS information of the at least one UE.

A special condition for the third condition may be that: in response to there is no dedicated transmission resource for the first device group but there is a common transmission resource between the first core network element and the access network element, the first core network element may send the data to the access network element through the common transmission resource.

Referring to FIG. 4, in response to there is no group-dedicated connection channel but a common connection channel between the RAN and the AMF, the AMF may send the data to the RAN through the common connection channel, with the group identification information being contained.

A fourth condition: in response to there is no common transmission resource between the first core network element and the access network element, the first core network element may request for establishing a common transmission resource between the first core network element and the access network element; and the first core network element may send the data to the access network element through the common transmission resource, the data containing the group identification information of the first device group or containing the identification information of at least one UE in the first device group and/or the PDU session information of the at least one UE and/or the QoS information of the at least one UE. Herein, the second core network element may be the SMF, and the third core network element may be the AMF.

In an implementation mode, the first core network element may request the third core network element through the second core network element for establishing the common transmission resource between the first core network element and the access network element, or, the first core network element may request the third core network element for establishing the common transmission resource between the first core network element and the access network element.

Referring to the operations 2a, 2b, 2c and 2 of FIG. 4, in response to there is no common connection channel between the RAN and the UPF, the UPF may send a request message for establishing a common connection channel (called a request message for short) to the SMF in the core network, as shown in operation 2a. As shown in operation 2b, the SMF may request the AMF for establishing the common connection channel between the UPF and the RAN. The AMF, after receiving the request message, may send the request message to the RAN, and the RAN may return a response message to acknowledge the establishment of the common connection channel. The AMF may transmit the response message to the SMF, and the SMF may notify information of the common connection channel in the response message to the UPF.

Referring to operation 3 in FIG. 4, after the RAN receives the group data from the UPF, the RAN may encapsulate the group data according to a protocol layer format between the RAN and UE. In response to there is a group-dedicated connection channel (for example, a dedicated physical resource, a dedicated physical-layer identifier, a dedicated logical channel, a dedicated bearer and a dedicated QoS flow) between the RAN and the UE, the group data may be sent to the UE through the group-dedicated connection channel. In response to there is no group-dedicated connection channel between the RAN and the UE, the RAN may contain the group identification information into the data and send the data to the UE. The UE may recognize the group data according to the group-dedicated connection channel or recognize the group data according to the group identification information.

Figure 5:
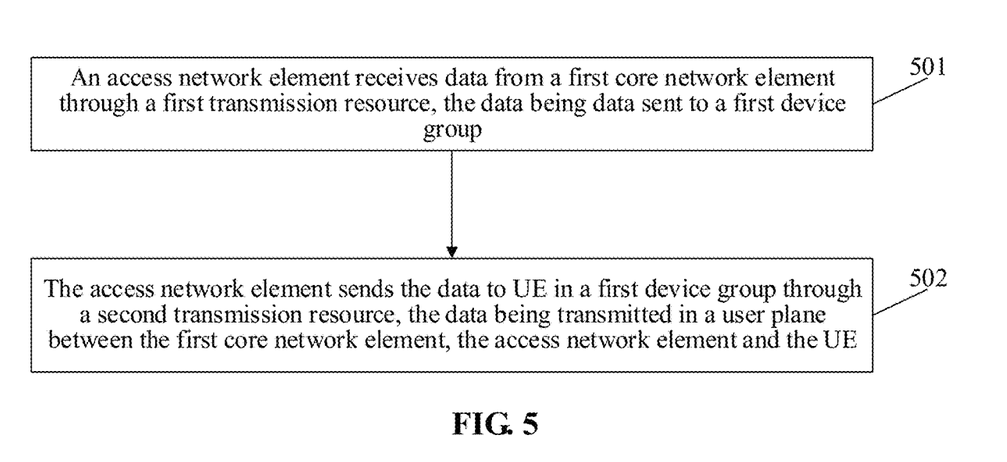
FIG. 5 is a second flowchart of a data transmission method according to an embodiment of the disclosure.

FIG. 5 is a second flowchart of a data transmission method according to an embodiment of the disclosure. As shown in FIG. 5, the data transmission method includes the following operations.

In operation 501, an access network element receives data from a first core network element through a first transmission resource, the data being data sent to a first device group.

In the embodiments of the disclosure, the first core network element may be a UPF, and the access network element may be a RAN.

In the embodiments of the disclosure, a transmission resource between the access network element and the first core network element is called the first transmission resource, and a transmission resource between the access network element and UE is called a second transmission resource.

In the embodiment of the disclosure, in a case that the first transmission resource and/or the second transmission resource are/is dedicated transmission resources/a dedicated transmission resource for the first device group, a device group corresponding to the data may be indicated as the first device group through resource attributes/a resource attribute of the first transmission resource and/or resource attributes/a resource attribute of the second transmission resource.

The first transmission resource and/or the second transmission resource may have at least one of the following resource attributes: a physical-layer identifier, a logical channel, a bearer, a QoS flow, a PDU session, an IP channel and a GTP channel.

In the embodiment of the disclosure, in a case that the first transmission resource and/or the second transmission resource are/is common transmission resources/a common transmission resource, the device group corresponding to the data may be indicated as the first device group through group identification information of the first device group carried during transmission of the data, or, the device group corresponding to the data may be indicates as the first device group through identification information of at least one UE in the first device group and/or PDU session information of the at least one UE and/or QoS information of the at least one UE which are/is carried during transmission of the data.

In 502, the access network element sends the data to UE in the first device group through a second transmission resource, the data being transmitted in a user plane between the first core network element, the access network element and the UE.

In the embodiments of the disclosure, the following data transmission manners may be adopted according to whether the second transmission resource is a dedicated transmission resource for the first device group.

1) In response to there is a dedicated transmission for the first device group between the access network element and the UE, the access network element may send the data to the UE in the first device group through the dedicated transmission resource.

2) In response to there is a common transmission resource between the access network element and the UE, the access network element may send the data to the UE in the first device group through the common transmission resource, the data containing the group identification information of the first device group or the identification information of at least one UE in the first device group and/or the PDU session information of the at least one UE and/or the QoS information of the at least one UE.

Figure 6:
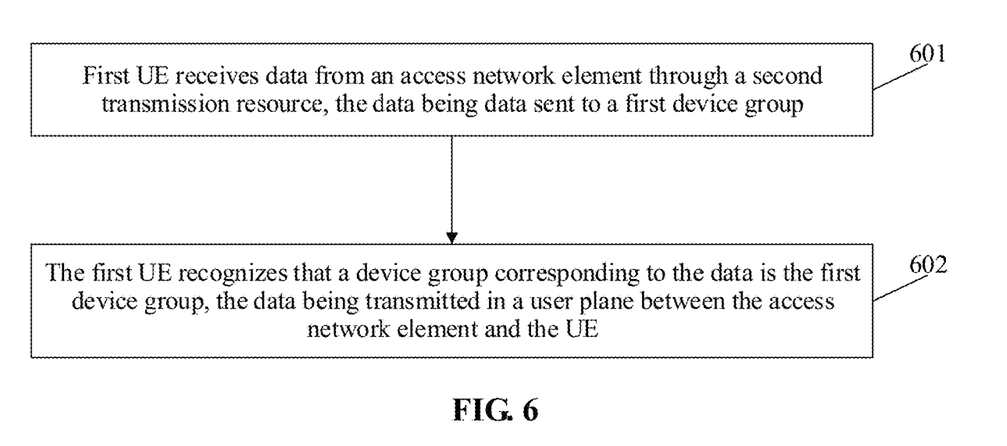
FIG. 6 is a third flowchart of a data transmission method according to an embodiment of the disclosure.

FIG. 6 is a third flowchart of a data transmission method according to an embodiment of the disclosure. As shown in FIG. 6, the data transmission method includes the following operations.

In operation 601, UE receives data from an access network element through a second transmission resource, the data being data sent to a first device group.

In operation 602, the UE recognizes that a device group corresponding to the data is the first device group, the data being transmitted in a user plane between the access network element and the UE.

In the embodiments of the disclosure, the UE, when belonging to the first device group, may process the data; or, the UE, when not belonging to the first device group, may discard the data.

In the embodiments of the disclosure, the operation that the UE recognizes that the device group corresponding to the data is the first device group may be implemented in the following manners.

A first manner: in a case that the second transmission resource is a dedicated transmission resource, the UE may recognize that the device group corresponding to the data is the first device group through a resource attribute of the second transmission resource.

The second transmission resource may have at least one of the following resource attributes: a physical-layer identifier, a logical channel, a bearer, a QoS flow, a PDU session, an IP channel and a GTP channel.

A second manner: in a case that the second transmission resource is a common transmission resource, the UE may recognize that the device group corresponding to the data is the first device group through group identification information of the first device group in the data or recognize that the device group corresponding to the data is the first device group through identification information of at least one UE in the first device group and/or PDU session information of the at least one UE and/or QoS information of the at least one UE in the data.

Figure 7:
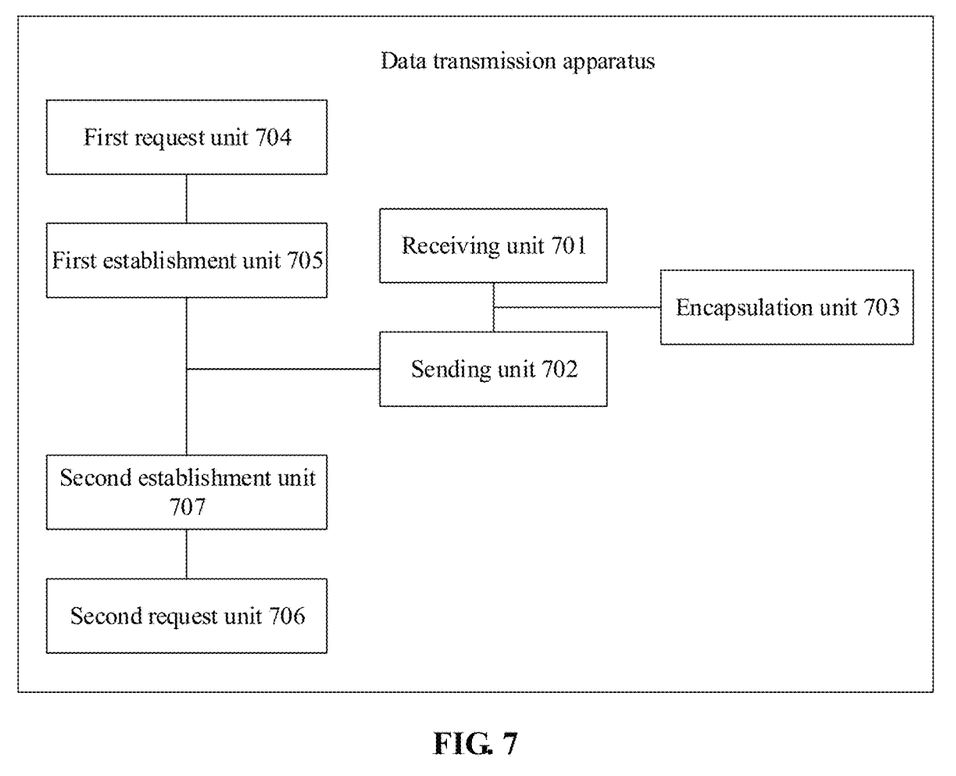
FIG. 7 is a first structure composition diagram of a data transmission apparatus according to an embodiment of the disclosure.

FIG. 7 is a first structure composition diagram of a data transmission apparatus according to an embodiment of the disclosure. The data transmission apparatus of the embodiment may be applied to a first core network element. The device may include a receiving unit 701 and a sending unit 702.

The receiving unit 701 is configured to receive data from an external network, the data being data sent to a first device group.

The sending unit 702 is configured to send the data to an access network element through a first transmission resource to enable the access network element to send the data to UE in the first device group through a second transmission resource.

The data may be transmitted in a user plane between the first core network element, the access network element and the UE.

In an implementation mode, in a case that the first transmission resource and/or the second transmission resource are/is dedicated transmission resources/a dedicated transmission resource for the first device group, a device group corresponding to the data may be indicated as the first device group through resource attributes/a resource attribute of the first transmission resource and/or resource attributes/a resource attribute of the second transmission resource.

In an implementation mode, the first transmission resource and/or the second transmission resource may have at least one of the following resource attributes: a physical-layer identifier, a logical channel, a bearer, a QoS flow, a PDU session, an IP channel and a GTP channel.

In an implementation mode, in a case that the first transmission resource and/or the second transmission resource are/is common transmission resources/a common transmission resource, the device group corresponding to the data may be indicated as the first device group through group identification information of the first device group is carried during transmission of the data, or, the device group corresponding to the data may be indicated as the first device group through identification information of at least one UE in the first device group and/or PDU session information of the at least one UE and/or QoS information of the at least one UE which are/is carried during transmission of the data.

In an implementation mode, the device may further include an encapsulation unit 703.

The encapsulation unit 703 is configured to encapsulate the group identification information of the first device group into a PDU of a target protocol layer corresponding to the UE, the PDU including the data.

In an implementation mode, the device may further include an encapsulation unit 703.

The encapsulation unit 703 is configured to encapsulate identification information of at least one UE in the first device group and/or the PDU session information of the at least one UE and/or the QoS information of the at least one UE into a PDU of a target protocol layer corresponding to the UE, the PDU including the data.

In an implementation mode, the target protocol layer may be an IP layer or an AS.

In an implementation mode, the receiving unit 701 is configured to receive the data from the external network through a third transmission resource, the third transmission resource being a dedicated transmission resource for the first device group.

In an implementation mode, the data sent by the external network may contain group identification information of the first device group or contain identification information of at least one UE in the first device group and/or PDU session information of the at least one UE and/or QoS information of the at least one UE. Herein, the identification information of the UE in the first device group may be external identification information, for example, a GPSI.

In an implementation mode, the device group corresponding to the data may be indicates as the first device group through a resource attribute of a third transmission resource; or, the device group corresponding to the data may be indicated as the first device group through the group identification information of the first device group in the data, or, the device group corresponding to the data may be indicated as the first device group through the identification information of at least one UE in the first device group and/or PDU session information of the at least one UE and/or QoS information of the at least one UE in the data.

In an implementation mode, in response to there is a dedicated transmission for the first device group between the first core network element and the access network element, the sending unit 702 may be further configured to send the data to the access network element through the dedicated transmission resource.

In an implementation mode, the device may further include a first request unit 704 and a first establishment unit 705.

The first request unit 704 is configured to, in response to there is no dedicated transmission resource for the first device group between the first core network element and the access network element, request for establishing a dedicated transmission resource for the first device group between the first core network element and the access network element.

The first establishment unit 705 is configured to establish the dedicated transmission resource for the first device group between the first core network element and the access network element.

The sending unit 702 is configured to send the data to the access network element through the dedicated transmission resource.

In an implementation mode, the first request unit 704 is configured to request a third core network element through a second core network element for establishing the dedicated transmission resource for the first device group between the first core network element and the access network element or request a third core network element for establishing the dedicated transmission resource for the first device group between the first core network element and the access network element.

In an implementation mode, the request unit is configured to, when requesting for establishing the dedicated transmission resource for the first device group between the first core network element and the access network element, send group information of the first device group to the third core network element, the group information of the first device group including at least one of PDU session information, QoS flow information, QoS information, core network address information, group identification information, an IP channel and a GTP channel.

In an implementation mode, in response to there is a common transmission resource between the first core network element and the access network element, the sending unit 702 is configured to send the data to the access network element through the common transmission resource, the data containing the group identification information of the first device group or containing the identification information of at least one UE in the first device group and/or the PDU session information of the at least one UE and/or the QoS information of the at least one UE.

In an implementation mode, in response to there is no dedicated transmission resource for the first device group but there is the common transmission resource between the first core network element and the access network element, the sending unit 702 is configured to send the data to the access network element through the common transmission resource, the data containing the group identification information of the first device group or containing the identification information of at least one UE in the first device group and/or the PDU session information of the at least one UE and/or the QoS information of the at least one UE.

In an implementation mode, the device may further include a second request unit 706 and a second establishment unit 707.

The second request unit 706 is configured to, in response to there is no common transmission resource between the first core network element and the access network element, request for establishing a common transmission resource between the first core network element and the access network element.

The second establishment unit 707 is configured to establish the common transmission resource between the first core network element and the access network element.

The sending unit 702 is configured to send the data to the access network element through the common transmission resource, the data containing the group identification information of the first device group or containing the identification information of at least one UE in the first device group and/or the PDU session information of the at least one UE and/or the QoS information of the at least one UE.

In an implementation mode, the second request unit 706 is configured to request a third core network element through the second core network element for establishing the common transmission resource between the first core network element and the access network element or request a third core network element for establishing the common transmission resource between the first core network element and the access network element.

Those skilled in the art should know that functions implemented by each unit in the data transmission apparatus shown in FIG. 7 may be understood with reference to related descriptions about the data transmission method. The functions of each unit in the data transmission apparatus shown in FIG. 7 may be realized through a program running in a processor, and may also be realized through a specific logical circuit.

Figure 8:
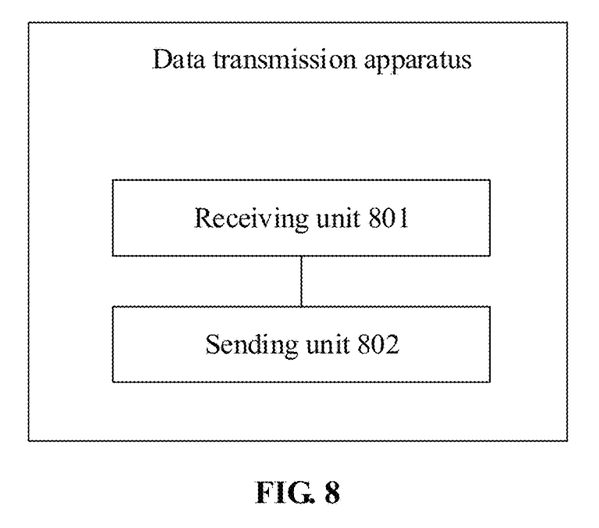
FIG. 8 is a second structure composition diagram of a data transmission apparatus according to an embodiment of the disclosure.

FIG. 8 is a second structure composition diagram of a data transmission apparatus according to an embodiment of the disclosure. The data transmission apparatus of the embodiment may be applied to an access network element. The device may include a receiving unit 801 and a sending unit 802.

The receiving unit 801 is configured to receive data from a first core network element through a first transmission resource, the data being data sent to a first device group.

The sending unit 802 is configured to send the data to UE in the first device group through a second transmission resource.

The data may be transmitted in a user plane between the first core network element, the access network element and the UE.

In an implementation mode, in a case that the first transmission resource and/or the second transmission resource are/is dedicated transmission resources/a dedicated transmission resource for the first device group, a device group corresponding to the data may be indicated as the first device group through resource attributes/a resource attribute of the first transmission resource and/or resource attributes/a resource attribute of the second transmission resource.

The first transmission resource and/or the second transmission resource may have at least one of the following resource attributes: a physical-layer identifier, a logical channel, a bearer, a QoS flow, a PDU session, an IP channel and a GTP channel.

In an implementation mode, in a case that the first transmission resource and/or the second transmission resource are/is common transmission resources/a common transmission resource, the device group corresponding to the data may be indicated as the first device group through group identification information of the first device group during transmission of the data, or, the device group corresponding to the data may be indicated as the first device group through identification information of at least one UE in the first device group and/or PDU session information of the at least one UE and/or QoS information of the at least one UE which are/is carried during transmission of the data.

In an implementation mode, in response to there is a dedicated transmission for the first device group between the access network element and the UE, the sending unit 802 is configured to send the data to the UE in the first device group through the dedicated transmission resource.

In an implementation mode, in response to there is a common transmission resource between the access network element and the UE, the sending unit 802 is configured to send the data to the UE in the first device group through the common transmission resource, the data containing the group identification information of the first device group or containing the identification information of at least one UE in the first device group and/or the PDU session information of the at least one UE and/or the QoS information of the at least one UE.

Those skilled in the art should know that functions realized by each unit in the data transmission apparatus shown in FIG. 8 may be understood with reference to related descriptions about the data transmission method. The functions of each unit in the data transmission apparatus shown in FIG. 8 may be implemented through a program running in a processor, or may also be implemented through a specific logical circuit.

Figure 9:
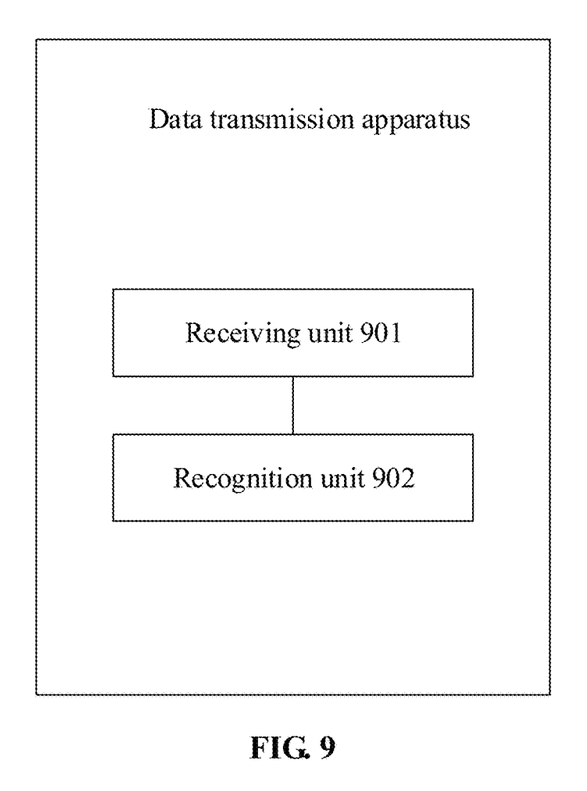
FIG. 9 is a third structure composition diagram of a data transmission apparatus according to an embodiment of the disclosure.

FIG. 9 is a third structure composition diagram of a data transmission apparatus according to an embodiment of the disclosure. The data transmission apparatus of the embodiment may be applied to UE. The device may include a receiving unit 901 and a recognition unit 902.

The receiving unit 901 is configured to receive data from an access network element through a second transmission resource, the data being data sent to a first device group.

The recognition unit 902 is configured to recognize that a device group corresponding to the data is the first device group.

The data may be transmitted in a user plane between the access network element and the UE.

In an implementation mode, in a case that the second transmission resource is a dedicated transmission resource, the recognition unit 902 is configured to recognize that the device group corresponding to the data is the first device group through a resource attribute of the second transmission resource.

The second transmission resource may have at least one of the following resource attributes: a physical-layer identifier, a logical channel, a bearer, a QoS flow, a PDU session, an IP channel and a GTP channel.

In an implementation mode, in a case that the second transmission resource is a common transmission resource, the recognition unit 902 is configured to recognize that the device group corresponding to the data is the first device group through group identification information of the first device group in the data or recognize that the device group corresponding to the data is the first device group through identification information of at least one UE in the first device group and/or PDU session information of the at least one UE and/or QoS information of the at least one UE in the data.

Those skilled in the art should know that functions realized by each unit in the data transmission apparatus shown in FIG. 9 may be understood with reference to related descriptions about the data transmission method. The functions of each unit in the data transmission apparatus shown in FIG. 9 may be implemented through a program running in a processor, and may also be realized through a specific logical circuit.

When being implemented in form of software functional module and sold or used as an independent product, the data transmission apparatuses of the embodiments of the disclosure may also be stored in a computer-readable storage medium. Based on such an understanding, the technical solutions of the embodiments of the disclosure substantially or parts making contributions to the conventional art may be embodied in form of software product, and the computer software product is stored in a storage medium, including a plurality of instructions configured to enable a computer device (which may be a personal computer, a server, a network device or the like) to execute all or part of the method in each embodiment of the disclosure. The storage medium includes: various media capable of storing program codes such as a U disk, a mobile hard disk, a Read Only Memory (ROM), a magnetic disk or an optical disk. Therefore, the embodiments of the disclosure are not limited to any specific hardware and software combination.

Correspondingly, the embodiments of the disclosure also provide a computer storage medium, in which a computer-executable instruction is stored, the computer-executable instruction being executed by a processor to implement the data transmission method of the embodiments of the disclosure.

Figure 10:
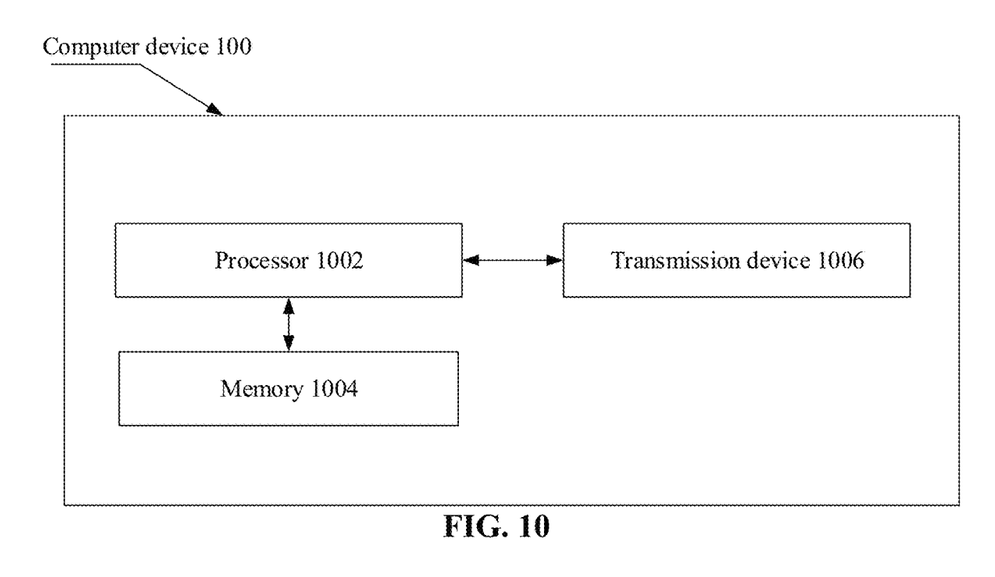
FIG. 10 is a structure composition diagram of a computer device according to an embodiment of the disclosure.

FIG. 10 is a structure diagram of a computer device according to an embodiment of the disclosure. The computer device may be UE or may also be a network device. As shown in FIG. 10, the computer device 100 may include one or more (only one is illustrated in the figure) processors 1002 (the processor 1002 may include, but not limited to, a processing device such as a Micro Control Unit (MCU) or a Field Programmable Gate Array (FPGA)); a memory 1004 configured to store data; and a transmission device 1006 configured for a communication function. Those of ordinary skill in the art should know that the structure shown in FIG. 10 is only schematic and not intended to limit the structure of the electronic device. For example, the computer device 100 may further include components more or fewer than the components shown in FIG. 10 or has a configuration different from that shown in FIG. 10.

The memory 1004 may be configured to store a software program of application software and a module, for example, a program instruction/module corresponding to a method in the embodiments of the disclosure. The processor 1002 may run the software program and module stored in the memory 1004, thereby executing various functional applications and data processing, namely implementing the abovementioned methods. The memory 1004 may include a high-speed random access memory and may also include a nonvolatile memory, for example, one or more magnetic storage devices, flash memories or other nonvolatile solid-state memories. In some examples, the memory 1004 may further include a memory arranged remotely relative to the processor 1002 and the remote memory may be connected to the computer device 100 through a network. An example of the network includes, but not limited to, the Internet, an intranet, a local area network, a mobile communication network and a combination thereof.

The transmission device 1006 is configured to receive or send data through a network. A specific example of the network may include a wireless network provided by a communication provider of the computer device 100. In an example, the transmission device 1006 may include a Network Interface Controller (NIC), which may be connected with another network device through a base station, thereby communicating with the Internet. In an example, the transmission device 1006 may be a Radio Frequency (RF) module, configured to communicate with the Internet in a wireless manner.

The technical solutions recorded in the embodiments of the disclosure may be freely combined without conflicts.

In some embodiments provided by the disclosure, it is to be understood that the disclosed method and intelligent device may be implemented in another manner. The device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part of all of the units may be selected according to a practical requirement to achieve the purposes of the solutions of the embodiments.

In addition, each functional unit in each embodiment of the disclosure may be integrated into a second processing unit, each unit may also serve as an independent unit and two or more than two units may also be integrated into a unit. The integrated unit may be implemented in a hardware form and may also be implemented in form of hardware and software functional unit.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure.

The invention claimed is:

1. A method for data transmission, comprising:
receiving, by a first core network element, data from an external network, the data being data sent to a first device group; and
sending, by the first core network element, the data to an access network element through a first transmission resource to enable the access network element to send the data to User Equipment (UE) in the first device group through a second transmission resource,
wherein the data is transmitted in a user plane between the first core network element, the access network element and the UE,
wherein sending, by the first core network element, the data to the access network element through the first transmission resource comprises:
in response to there is no dedicated transmission resource for the first device group between the first core network element and the access network element, requesting for establishing a dedicated transmission resource for the first device group between the first core network element and the access network element;
establishing the dedicated transmission resource for the first device group between the first core network element and the access network element; and
sending the data to the access network element through the dedicated transmission resource.

2. The method of claim 1, wherein, in a case that at least one of the first transmission resource or the second transmission resource is dedicated transmission resource(s) for the first device group, a device group corresponding to the data is indicated as the first device group through a resource attribute(s) of at least one of the first transmission resource or the second transmission resource.

3. The method of claim 2, wherein at least one of the first transmission resource or the second transmission resource has at least one of following resource attributes: a physical-layer identifier, a logical channel, a bearer, a Quality of Service (QoS) flow, a Protocol Data Unit (PDU) session, an Internet Protocol (IP) channel, or a General Packet Radio Service (GPRS) Tunneling Protocol (GTP) channel.

4. The method of claim 1, wherein, in a case that at least one of the first transmission resource or the second transmission resource is common transmission resource(s), a device group corresponding to the data is indicated as the first device group through group identification information of the first device group carried during transmission of the data, or, a device group corresponding to the data is indicated as the first device group through at least one of followings carried during transmission of the data: identification information of the UE in the first device group, or PDU session information of the UE, or QoS information of the UE.

5. The method of claim 4, wherein
the operation that the device group corresponding to the data is indicated as the first device group through the group identification information of the first device group carried during transmission of the data comprises:

encapsulating, by the first core network element, the group identification information of the first device group into a PDU of a target protocol layer corresponding to the UE, the PDU comprising the data; or the operation that the device group corresponding to the data is indicated as the first device group through at least one of followings carried during transmission of the data: the identification information of the UE in the first device group, or the PDU session information of the UE, or the QoS information of the UE comprises that:

encapsulating, by the first core network element, at least one of followings: the identification information of the at least one UE in the first device group, or the PDU session information of the UE, or the QoS information of the UE into a PDU of a target protocol layer corresponding to the UE, the PDU comprising the data.

6. The method of claim 5, wherein the target protocol layer is an IP layer or an Access Stratum (AS).

7. A method for data transmission, comprising:
receiving, by User Equipment (UE), data from an access network element through a second transmission resource, the data being data sent to a first device group; and
recognizing, by the UE, that a device group corresponding to the data is the first device group,
wherein the data is transmitted in a user plane between a first core network element, the access network element and the UE,
in response to there is no dedicated transmission resource for the first device group between the first core network element and the access network element, a dedicated transmission resource for the first device group between the first core network element and the access network element is requested to be established by the first core network element, and the data is sent to the access network element by the first core network element through the dedicated transmission resource.

8. The method of claim 7, wherein recognizing, by the UE, that the device group corresponding to the data is the first device group comprises:
in a case that the second transmission resource is a dedicated transmission resource, recognizing, by the UE, that the device group corresponding to the data is the first device group through a resource attribute of the second transmission resource.

9. The method of claim 8, wherein the second transmission resource has at least one of following resource attributes: a physical-layer identifier, a logical channel, a bearer, a Quality of Service (QoS) flow, a Protocol Data Unit (PDU) session, an Internet Protocol (IP) channel, or a General Packet Radio Service (GPRS) Tunneling Protocol (GTP) channel.

10. An apparatus for data transmission, implemented by a first core network element, comprising:
a processor, and
a transmission device, configured to send and receive information under control of the processor,
wherein the transmission device is configured to:
receive data from an external network, the data being data sent to a first device group; and
send the data to an access network element through a first transmission resource to enable the access network element to send the data to User Equipment (UE) in the first device group through a second transmission resource, wherein the data is transmitted in a user plane between the first core network element, the access network element and the UE,
wherein the transmission device is further configured to, in response to there is no dedicated transmission resource for the first device group between the first core network element and the access network element, request for establishing a dedicated transmission resource for the first device group between the first core network element and the access network element;
the processor is further configured to establish the dedicated transmission resource for the first device group between the first core network element and the access network element; and
the transmission device is further configured to send the data to the access network element through the dedicated transmission resource.

11. The apparatus of claim 10, wherein the transmission device is further configured to receive the data from the external network through a third transmission resource, the third transmission resource being the dedicated transmission resource for the first device group.

12. The apparatus of claim 11, wherein the data sent by the external network contains group identification information of the first device group or contains at least one of followings: identification information of the UE in the first device group or Protocol Data Unit (PDU) session information of the UE, or Quality of Service (QoS) information of the UE; or,
a device group corresponding to the data is indicated as the first device group through a resource attribute of the third transmission resource; or,
the device group corresponding to the data is indicated as the first device group through the group identification information of the first device group in the data; or,
the device group corresponding to the data is indicated as the first device group through at least one of followings carried in the data: identification information of the UE in the first device group, or PDU session information of the UE, or QoS information of the UE.

13. The apparatus of claim 12, wherein the identification information of the UE in the first device group is external identification information.

14. The apparatus of claim 10, wherein the transmission device is further configured to:
request a third core network element through a second core network element for establishing the dedicated transmission resource for the first device group between the first core network element and the access network element or request the third core network element for establishing the dedicated transmission resource for the first device group between the first core network element and the access network element; and
send, when requesting for establishing the dedicated transmission resource for the first device group between the first core network element and the access network element, group information of the first device group to the third core network element,
wherein the group information of the first device group comprises at least one of followings: Protocol Data Unit (PDU) session information, Quality of Service (QoS) flow information, QoS information, core network address information, group identification information, an Internet Protocol (IP) channel, or a General Packet Radio Service (GPRS) Tunneling Protocol (GTP) channel.

15. The apparatus of claim 10, wherein,
in response to there is a common transmission resource between the first core network element and the access network element, the transmission device is further configured to send the data to the access network element through the common transmission resource, the data containing group identification information of the first device group or containing at least one of identification information of the UE in the first device group or PDU session information of the UE or QoS information of the UE; and
in response to there is no dedicated transmission resource for the first device group but there is the common transmission resource between the first core network element and the access network element, the transmission device is further configured to send the data to the access network element through the common transmission resource.

16. The apparatus of claim 10, wherein
the processor is further configured to:
   in response to there is no common transmission resource between the first core network element and the access network element, request for establishing a common transmission resource between the first core network element and the access network element; and
   establish the common transmission resource between the first core network element and the access network element,
the transmission device is further configured to:
   send the data to the access network element through the common transmission resource, the data containing group identification information of the first device group or containing at least one of followings: identification information of the UE in the first device group, or PDU session information of the UE, or QoS information of the UE; and
   request a third core network element through a second core network element for establishing the common transmission resource between the first core network element and the access network element or request the third core network element for establishing the common transmission resource between the first core network element and the access network element.

17. An apparatus for data transmission, implemented by User Equipment (UE), comprising:
   a processor, and
   a transmission device, configured to send and receive information under control of the processor,
   wherein the transmission device is configured to receive data from an access network element through a second transmission resource, the data being data sent to a first device group; and
   the processor is further configured to recognize that a device group corresponding to the data is the first device group,
   wherein the data is transmitted in a user plane between a first core network element, the access network element and the UE,
   in response to there is no dedicated transmission resource for the first device group between the first core network element and the access network element, a dedicated transmission resource for the first device group between the first core network element and the access network element is requested to be established by the first core network element, and the data is sent to the access network element by the first core network element through the dedicated transmission resource.

18. The apparatus of claim 17, wherein, in a case that the second transmission resource is a common transmission resource, the processor is further configured to recognize that the device group corresponding to the data is the first device group through group identification information of the first device group in the data or through at least one of followings carried in the data: identification information of the UE in the first device group, or PDU session information of the UE, or QoS information of the UE.

* * * * *